(12) United States Patent
Hessbrueggen (10) Patent No.: US 9,095,954 B2
(45) Date of Patent: Aug. 4, 2015

(54) APPARATUS FOR MACHINING AN ELONGATED WORKPIECE

(75) Inventor: Norbert Hessbrueggen, Salach (DE)

(73) Assignee: EMAG HOLDING GMBH, Salach (DE)

( * ) Notice: Subject to any disclaimer, the term of this patent is extended or adjusted under 35 U.S.C. 154(b) by 559 days.

(21) Appl. No.: 13/555,626

(22) Filed: Jul. 23, 2012

(65) Prior Publication Data

US 2013/0029567 A1  Jan. 31, 2013

(30) Foreign Application Priority Data

Jul. 28, 2011  (DE) .......................... 10 2011 108 742

(51) Int. Cl.
| *B24B 41/02* | (2006.01) |
|---|---|
| *B24B 19/12* | (2006.01) |
| *B24B 27/00* | (2006.01) |
| *B23B 3/06* | (2006.01) |
| *B23B 3/16* | (2006.01) |
| *B23Q 39/02* | (2006.01) |
| *B24B 5/42* | (2006.01) |
| *B23Q 39/00* | (2006.01) |

(52) U.S. Cl.
CPC ................. *B24B 41/02* (2013.01); *B23B 3/065* (2013.01); *B23B 3/168* (2013.01); *B23Q 39/026* (2013.01); *B24B 19/12* (2013.01); *B24B 27/0076* (2013.01); *B23Q 2039/004* (2013.01); *B23Q 2039/008* (2013.01); *B23Q 2240/007* (2013.01); *B24B 5/42* (2013.01); *B24B 5/421* (2013.01)

(58) Field of Classification Search
CPC ........ B23B 3/167; B23B 3/168; B23B 9/005; B23B 3/065; B23Q 7/047; B23Q 39/021; B23Q 39/02; B23Q 2039/002; B23Q 39/026; B23Q 2039/008; B23Q 2039/004; B23Q 2240/007; B24B 5/42; B24B 5/421; B24B 5/423; B24B 19/12; B24B 27/0076; B24B 41/02
USPC ........ 82/122, 123, 129; 451/62, 65, 190, 194, 451/210, 242, 361
See application file for complete search history.

(56) References Cited

U.S. PATENT DOCUMENTS

| 4,800,790 | A * | 1/1989 | Hasz ............................... 82/148 |
|---|---|---|---|
| 6,419,563 | B1 * | 7/2002 | Ido et al. ........................ 451/57 |
| 6,758,117 | B2 * | 7/2004 | Baumann et al. ............... 82/117 |
| 7,037,173 | B2 * | 5/2006 | Nonoyama et al. .............. 451/5 |
| 7,039,992 | B2 * | 5/2006 | Tokuma et al. ............... 29/27 C |
| 7,086,316 | B2 * | 8/2006 | Lange et al. .................... 82/122 |
| 7,506,565 | B2 * | 3/2009 | Ueda et al. ...................... 82/124 |
| 8,136,214 | B2 * | 3/2012 | Hessbruggen ................ 29/27 C |

(Continued)

FOREIGN PATENT DOCUMENTS

DE  102008037145 A  3/2009

*Primary Examiner* — Timothy V Eley
(74) *Attorney, Agent, or Firm* — Andrew Wilford (57) ABSTRACT

An apparatus for machining an elongated workpiece with a tool a support column having a generally planar and vertical front wall and a pair of generally planar, parallel, and vertical side walls projecting rearward from respective outer edges of the front wall. A workpiece holder on the front wall can hold the workpiece forward of the front wall in a vertical orientation. A vertical guide secured to one of the side walls carries a vertical slide shiftable along the vertical guide. A front horizontal guide on the vertical slide forward of the front wall from the guide carries tool holder shiftable in the front horizontal guide on the vertical slide forward of the front wall and is adapted to hold the tool.

14 Claims, 8 Drawing Sheets

(56) References Cited

U.S. PATENT DOCUMENTS

| | | | |
|---|---|---|---|
| 8,398,455 B2 * | 3/2013 | Schmitz | 451/5 |
| 8,491,357 B2 * | 7/2013 | Hessbrueggen | 451/399 |
| 2008/0051013 A1 * | 2/2008 | Burgess | 451/51 |
| 2008/0207090 A1 * | 8/2008 | Itoh et al. | 451/11 |

\* cited by examiner

Fig. 1

APPARATUS FOR MACHINING AN ELONGATED WORKPIECE

FIELD OF THE INVENTION

The present invention relates to a machining apparatus. More particularly this invention concerns an apparatus for grinding, milling, boring, lathing, or otherwise machining an elongated workpiece.

BACKGROUND OF THE INVENTION

A standard apparatus for machining an elongated workpiece with a tool is described in German patent document 10 2008 037145. It has a support column having a generally planar and vertical front wall on which is mounted a workpiece holder for holding the workpiece forward of the front wall in a vertical orientation. A pair of vertical guides on the front is walls flank the workpiece holder and each carry a vertically shiftable vertical slide forward of the front wall. Each vertical slide in turn has a horizontal guide on which is mounted a respective tool holder horizontally shiftable in the respective horizontal guide on the vertical slide forward of the front wall and adapted to hold a respective tool. Thus horizontal movement of the holders on the respective vertical slides engages the tools horizontally with the workpiece in the workpiece holder and vertical movement of the vertical slides in the respective guide moves the tools vertically along the tool.

The problem with this construction is that it is quite wide. The guides and workpiece holder must move vertically in their own paths so that the apparatus has to be wide enough measured horizontally parallel to the front wall to accommodate all this equipment. This is disadvantageous in an operation where a number of such apparatuses need to be accommodated and, often, served by a single person or automatic loader/unloader.

OBJECTS OF THE INVENTION

It is therefore an object of the present invention to provide an improved machining apparatus for elongated workpieces. Another object is the provision of such an improved machining apparatus for elongated workpieces that overcomes the above-given disadvantages, in particular that is of reduced width.

SUMMARY OF THE INVENTION

An apparatus for machining an elongated workpiece with a tool a support column having a generally planar and vertical front wall and a pair of generally planar, parallel, and vertical side walls projecting rearward from respective outer edges of the front wall. A workpiece holder on the front wall can hold the workpiece forward of the front wall in a vertical orientation. A vertical guide secured to one of the side walls carries a vertical slide shiftable along the vertical guide. A front horizontal guide on the vertical slide forward of the front wall from the guide carries tool holder shiftable in the front horizontal guide on the vertical slide forward of the front wall and is adapted to hold the tool. Thus horizontal movement of the holder on the vertical slide engages the tool horizontally with the workpiece in the workpiece holder and vertical movement of the vertical slide in the guide moves the tool vertically along the workpiece.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

DETAILED DESCRIPTION

Figure 1:
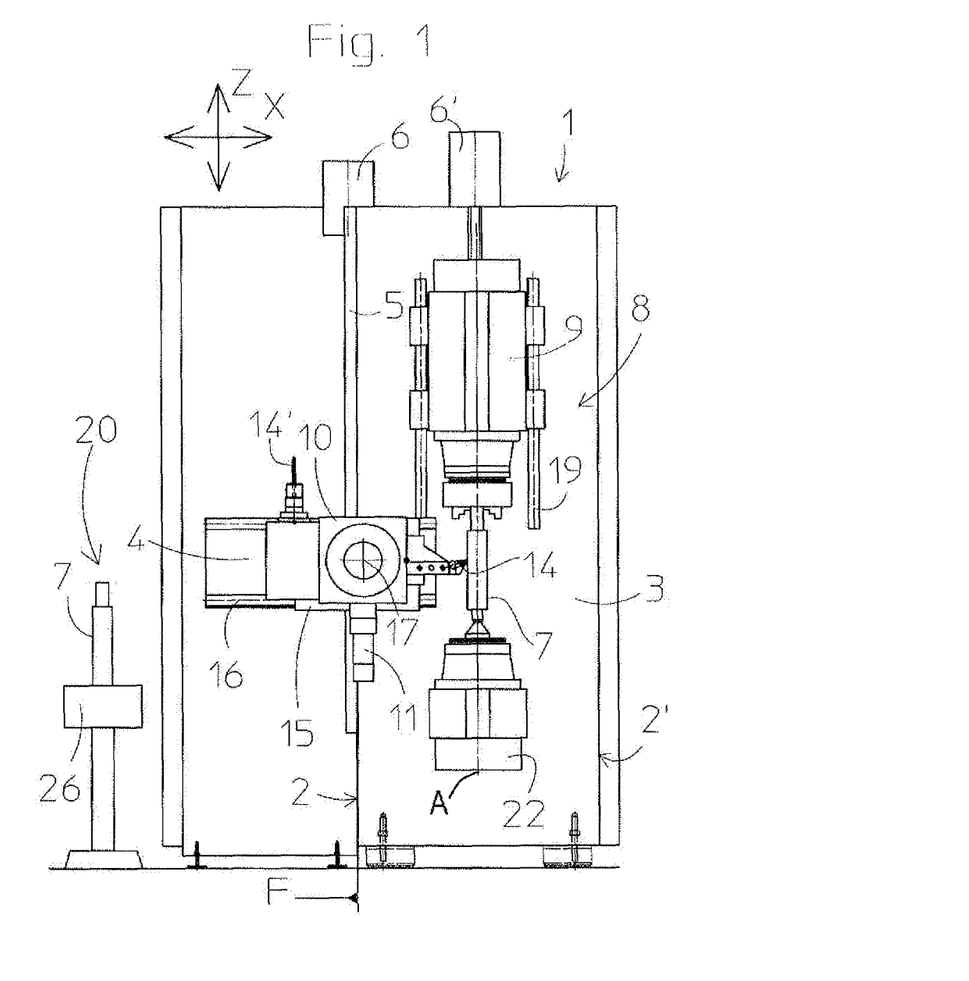
FIG. 1 is a small-scale elevational front view of a first embodiment of the apparatus according to the invention.

As seen in FIG. 1 a machining apparatus according to the invention has a machine frame formed by a column 1 of square cross-section and having vertical and planar side walls 2 and 2' and a similarly vertical and planar front wall 3 extending between front edges of the side walls 2 and 2'. The front wall 3 defines a plane E (FIG. 3d), and the side walls 2 define parallel planes F perpendicular thereto. The side wall 2 carries a pair of vertical guide rails 5 on which a vertical slide 4 can shift vertically parallel to a vertical axis Z. An actuator 6 carried at the top of the wall 2 engages via an unillustrated ball screw with the vertical slide 4 to shift it up and down. The vertical slide 4 in turn is provided with a pair of vertically spaced and horizontally extending guide rails 16 on which a horizontal slide 15 can travel under the control of an unillustrated drive like the actuator 6. This slide 15 in turn carries a tool holder 10 that is pivotal on the slide 15 about a horizontal axis 17 perpendicular to the plane E. The holder 10 holds tools 14 and 14' and a grab 11.

A workpiece holder 8 is provided on the front wall 3 and comprises a driven headstock 9 and a coaxial tailstock 22. The headstock 9 can be moved along vertical guide rails 19 on the front wall 3 above the tailstock 22. An actuator 6' like the actuator 6 can vertically displace the headstock 9. During machining the workpiece 7 is rotated about a vertical axis A.

A conveyor 26 transports unmachined workpieces 7 to a loading/unloading station 20 and moves machined workpieces 7 away from it. For loading, the grab 11 removes a workpiece 7 from the station 20 and fit it to the headstock 9 and tailstock 22. For unloading the grab 11 takes the finished workpiece 7 and places it in the station 20, with appropriate movement of the slide 15 in its guide 16 and of the holder 10 about its axis 17.

Figure 2:
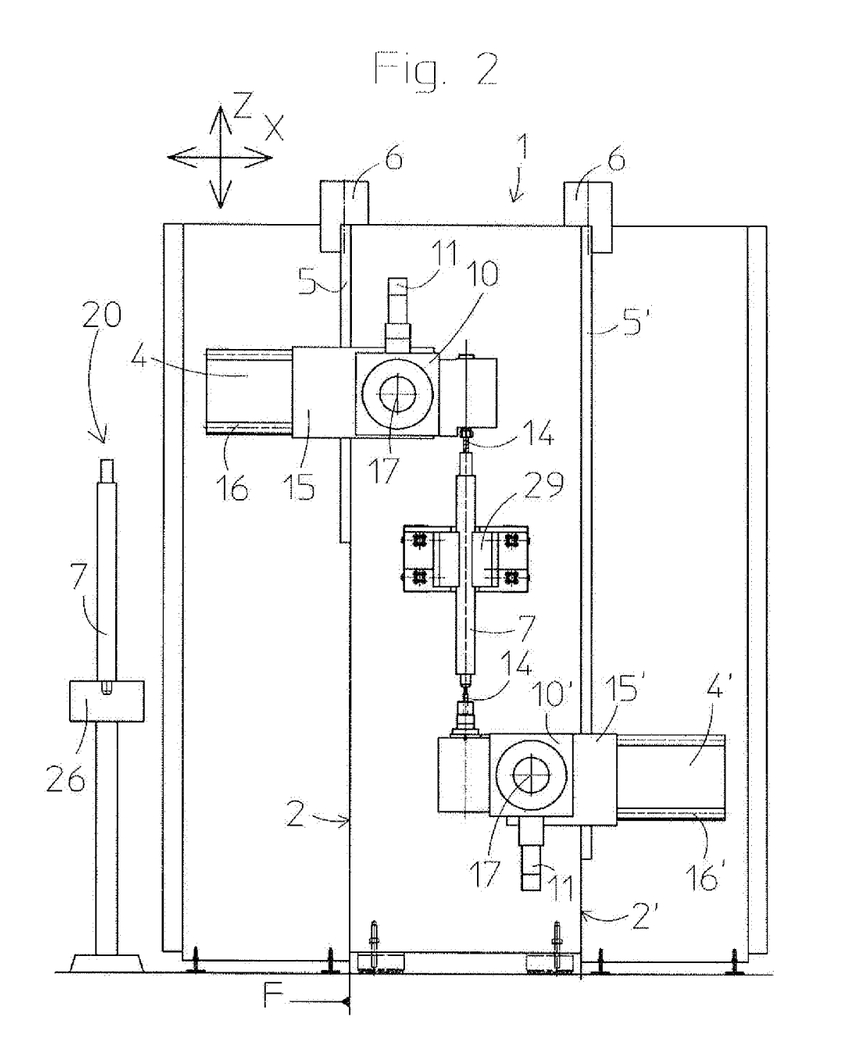
FIG. 2 is a view like FIG. 1 of a second apparatus according to the invention.

The machining apparatus of FIG. 2 serves for end machining. Here the workpiece 7 is clamped centrally in a vise 29 fixed on the front wall 3 forward of the plane E so that it is vertically fixed and nonrotatable. On the right-hand side wall 2' of the machine, a second guide 5', vertical slide 4', slide 15', and tool holder 10' are provided, symmetrically to the first guide 5, vertical slide 4, guide 16, etc. This assembly can also is move parallel to the vertical axis Z and horizontally parallel to the axis X. The symmetrical arrangement of the two tool assemblies allows workpieces 7 to be machined simultaneously on both ends. While the workpiece 7 is securely clamped in the vise 29 the tools 14 are rotated.

Figure 3:
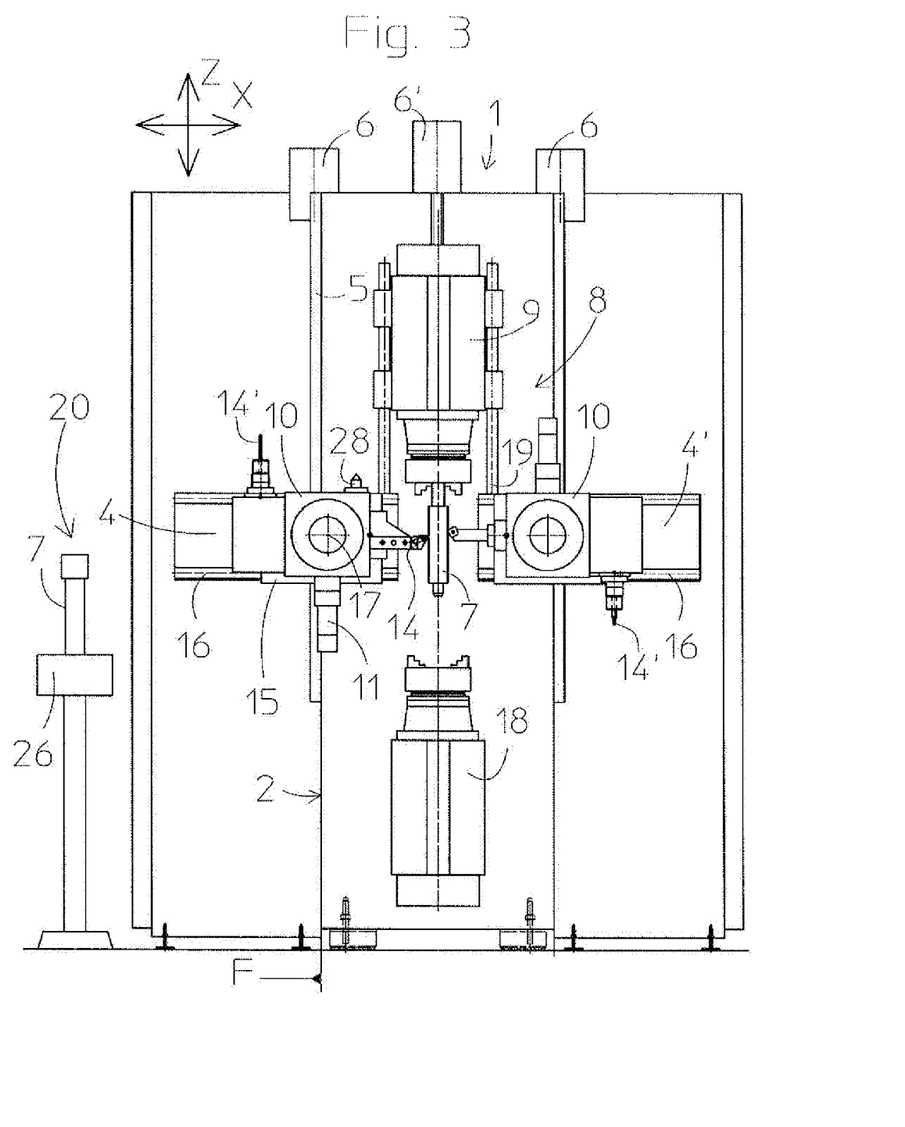
FIG. 3 is a view like FIG. 1 of a third apparatus according to the invention.

In FIG. 3 the system is identical to that of FIG. 2 except that instead of the vise 29 the front wall 3 carries an upper vertically shiftable headstock 9 like in FIG. 1 and an also driven lower headstock 18 axially aligned with the upper headstock 9. This way the workpiece 7 can have its sides machined along its full length as in FIG. 1, and by moving it axially back and forth between the chucks of the headstocks 9 and 18 it is also possible to machine both ends of the workpiece 7, for instance drilling a hole in the end. A tailstock center 28 is advantageously provided on the workpiece holder 10. This enables the workpiece 7 to be supported whenever machining does not allow clamping in the lower headstock 18.

Figure 3A:
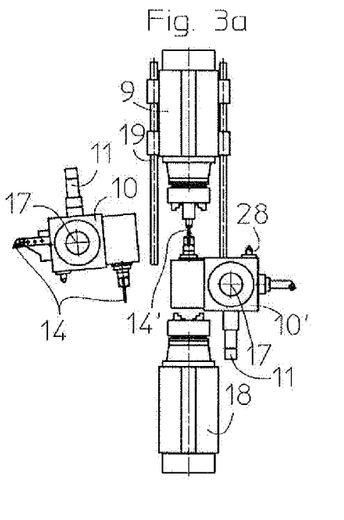
FIGS. 3a-3c are front views showing the machine of FIG. 3 in different positions for end machining.
Figure 3B:
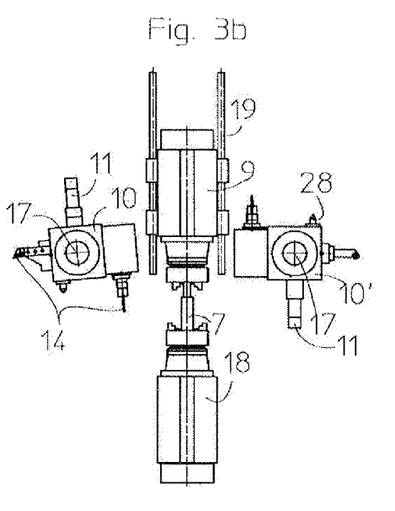
Figure 3C:
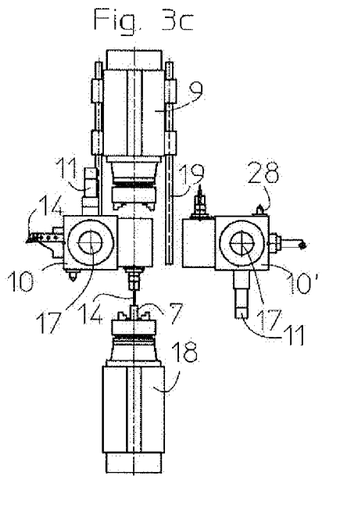

To machine the lower end of the workpiece 7, it is first clamped in the headstock 9 and this lower end is machined by the tool 14 as shown in FIG. 3a. The headstock 9 then travels downward (FIG. 3b) and transfers the workpiece 7 to the chuck of the lower headstock 18 and then returns to its original upper position, whereupon the workpiece holder 10 moves horizontally and pivots about its axis 17 until its tool 14 is concentric to the lower headstock 18. The upper end of the workpiece 7 projecting up from the lower headstock 18 can then be machined (FIG. 3c).

Figure 3D:
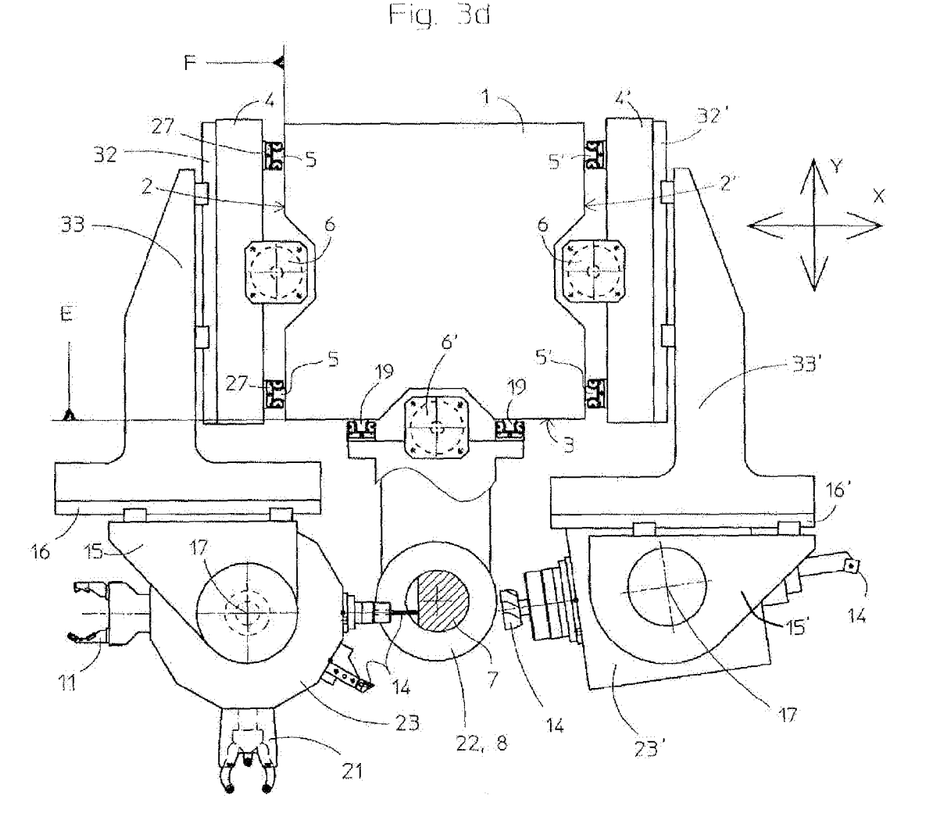
FIG. 3d is a top view of a fourth apparatus according to the invention.

FIG. 3d shows how vertical slides 4 and 4' movable vertically along the side-wall guides 5 and 5' can carry is respective horizontal guide rails 32 and 32' on which respective intermediate slides 33 and 33' can shift horizontally forward and back parallel to the horizontal axis Y and perpendicular to the plane E. In turn the front horizontal guides 16 and 16 are fixed on the vertically and horizontally movable slides 33 and 33' and carry the tool slides 15 and 15'. Here also tool holders 23 and 23' are pivotal about vertical axes 17 on the slides 15 and 15' and carry the various machining, drilling, and grinding tools 14. The holder 23 also carries, in addition to the grab 11 and tools 14, a steady rest 21 for holding the workpiece 7 on center during machining, if necessary. This arrangement allows the distance between tool engagement of the workpiece and machine frame to be significantly shortened. As a result, the flow of force is improved and the rigidity of the machine is significantly enhanced.

Figure 4:
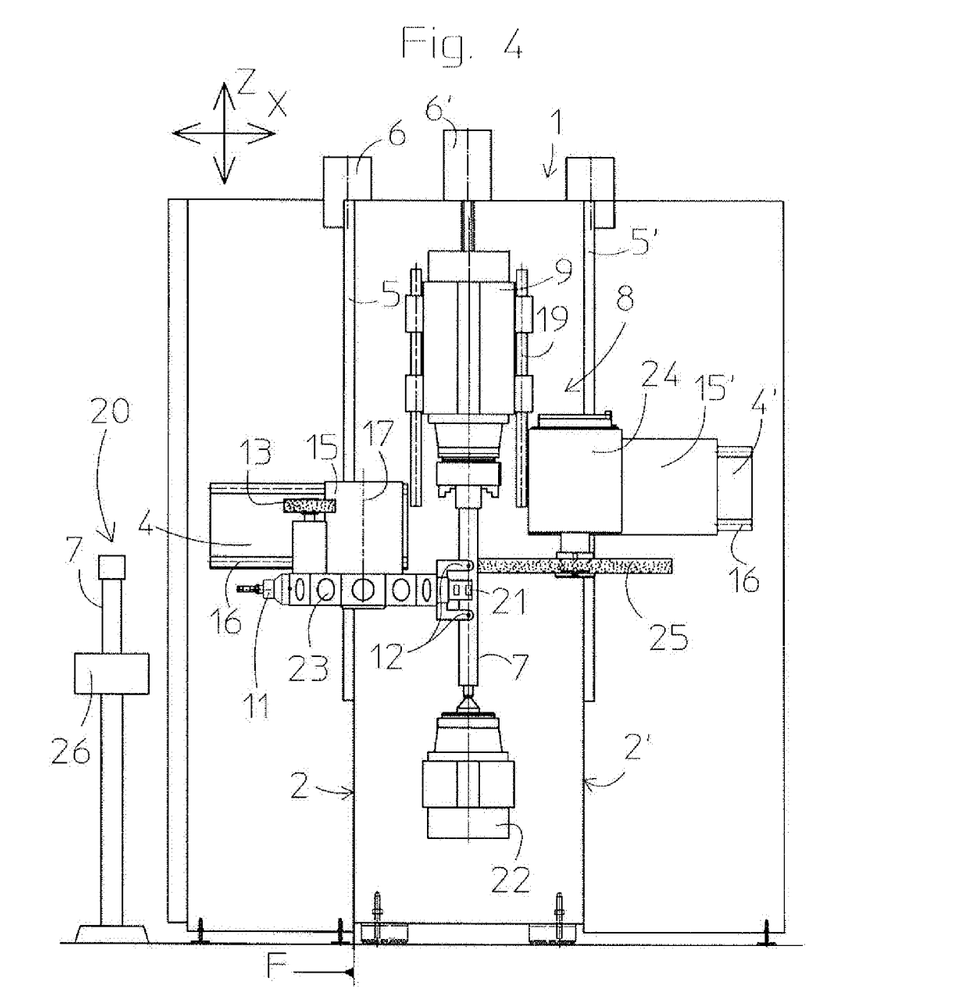
FIG. 4 is a front view of a fifth apparatus in accordance with the invention.
Figure 5:
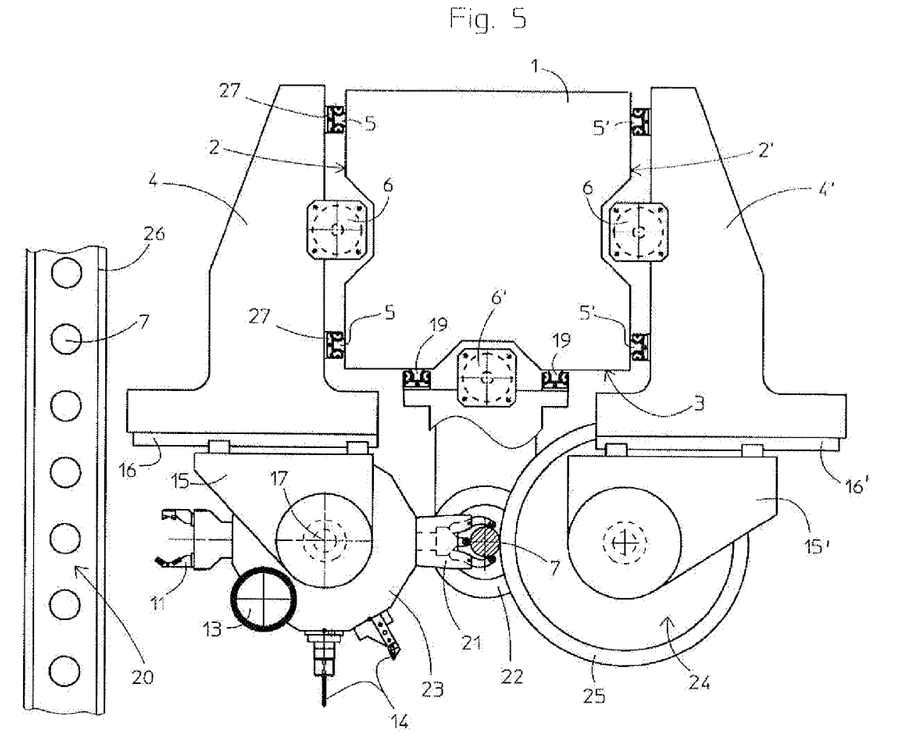
FIG. 5 is a top view of the fifth apparatus.

In the grinding machine of FIGS. 4 and 5, two vertical slides 4 and 4', and horizontal slides 15 and 15' are able to move vertically via shoes 27 (FIG. 5) on the guides 5 and 5' along the side walls 2 and 2' of the column 1, as is the case with the apparatus for end machining of FIG. 3. A grinding spindle head 24 with grinding wheel 25 carried on the slide 15' can be shifted horizontally toward the workpiece 7 on the horizontal guide 16. A multifunction unit 23 is associated with grinding spindle head 24 on the opposite side of workpiece 7. This unit 23 is rotatably supported on the horizontal slide 15 about a vertical pivot axis 17.

Various modules on the multifunction unit 23 include the self-centering steady rest 21 and two sensors 12 that support and effect in-process measurement of the workpiece 7. The sensors 12 are concentric relative to the steady rest 21, thereby enabling the workpiece diameter to be gauged during grinding and support to be simultaneously provided by the steady rest 21. In addition, the grinding wheel 25 can be dressed by a unit 13 carried on the slide 15. Loading and unloading is effected with the grab 11, as in FIG. 1.

The arrangement of vertical slides 4 and 4' on both walls 2 and 2', and of the workpiece holder on the front wall 3 of the column 1 produces an especially rigid construction for the machine. The grinding machine is nevertheless extremely compact and takes up only a small footprint. In addition, the machine can be flexibly employed because the multifunction unit 23 together with different tools 14 and the steady rest 21 enable complex machining procedures to be performed. A total of only four controlled linear axes is required since the grab 11, the sensor 12, and the dressing unit 13 are all mounted on the multifunction unit 23 that is movable in two axes. For loading and unloading, the grab 11 removes workpieces 7 from the station 20 and feeds them to the headstock 9. As this occurs, the horizontal slide travels along the guide rails 16, while the tool holder 10 pivots about the pivot axis 17.

Figure 6:
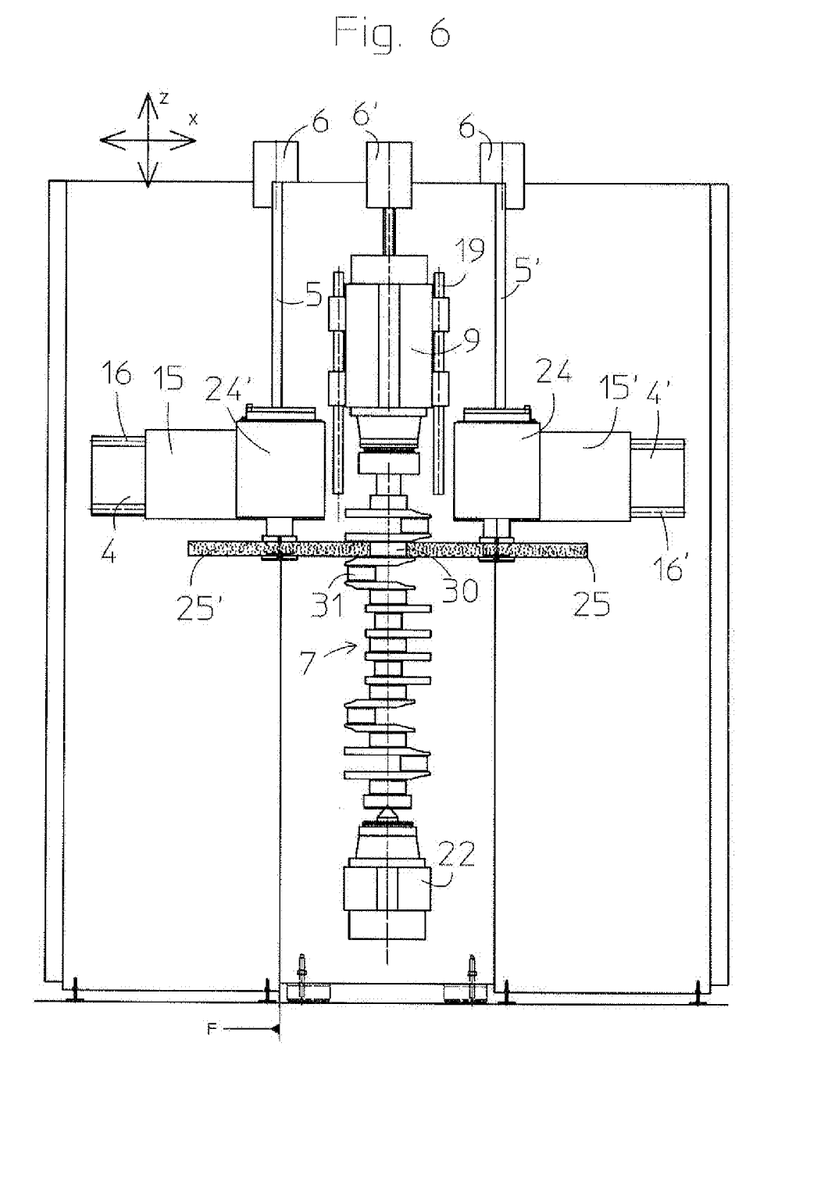
FIG. 6 is a front view of a sixth apparatus of this invention.

FIG. 6 shows a four-axis grinding machine for synchronous grinding. Here two grinders 24 and 24' are disposed in mirror-inverted fashion, and can move in the X axis and Z axis on the respective vertical slides 4 and 4' and horizontal slides 15 and, 15'. This arrangement enables, for example, a main bearing 30 of a crankshaft to be ground. Similarly, the crank pins 31 of a center-clamped crankshaft can be machined using the pendulum-stroke method.

I claim:

1. An apparatus for machining an elongated workpiece with a tool, the apparatus comprising:
    a support column having a generally planar and vertical front wall and a pair of generally planar, parallel, and vertical side walls projecting rearward from respective outer edges of the front wall;
    a conveyor defining a loading/unloading station laterally adjacent the column;
    a workpiece holder on the front wall adapted to hold the workpiece forward of the front wall in a vertical orientation;
    a vertical guide secured to one of the side walls;
    a vertical slide vertically shiftable along the vertical guide;
    a front horizontal guide on the vertical slide forward of the front wall from the guide; and
    a tool holder horizontally shiftable in the front horizontal guide on the vertical slide forward of the front wall, pivotal about an axis, and adapted to hold the tool, whereby horizontal movement of the holder on the vertical slide engages the tool horizontally with the workpiece in the workpiece holder and vertical movement of the vertical slide in the guide moves the tool vertically along the workpiece; and
    a grab on the tool holder for moving the workpiece horizontally between the loading/unloading station and a position forward of the front wall and engaged in the workpiece holder.

2. The machining apparatus defined in claim 1, wherein the workpiece holder is a vise on the front wall.

3. The machining apparatus defined in claim 1, wherein the workpiece holder includes a driven headstock and a tailstock axially aligned on the front wall.

4. The machining apparatus defined in claim 1, wherein the workpiece holder includes a pair of spaced and axially aligned driven headstocks.

5. The machining apparatus defined in claim 1, further comprising
    a horizontal slide shiftable on the front horizontal guide, the tool holder being pivotal about an axis on the horizontal slide.

6. The machining apparatus defined in claim 5, wherein the tool holder carries a plurality of the tools and is displaceable through a plurality of positions in each of which a respective one of the tools is engageable with the workpiece held in the workpiece holder.

7. The machining apparatus defined in claim 5, wherein the tool holder carries a steady rest and a workpiece-size measurer.

8. The machining apparatus defined in claim 1, further comprising:
- a second vertical guide secured to the other of the side walls;
- a second vertical slide vertically shiftable along the second vertical guide;
- a second front horizontal guide on the second vertical slide forward of the front wall from the guide; and
- a second tool holder horizontally shiftable in the second front horizontal guide on the vertical slide forward of the front wall and adapted to hold at least one tool, the tool holders flanking the workpiece in the workpiece holder.

9. The machining apparatus defined in claim 8 wherein the tool of the second tool holder is a grinding wheel engageable with the workpiece.

10. The machining apparatus defined in claim 9, wherein the tool of the first-mentioned tool holder is also a grinding wheel engageable with the workpiece.

11. The machining apparatus defined in claim 8, further comprising:
- lateral horizontal guides on the vertical slides; and
- respective intermediate slides horizontally shiftable in the lateral horizontal guides and carrying the front horizontal guides on which the respective horizontal slides can move.

12. An apparatus for machining an elongated workpiece with a tool, the apparatus comprising:
- a support column having a generally planar and vertical front wall and a first and second generally planar, parallel, and vertical side walls projecting rearward from respective outer edges of the front wall;
- a workpiece holder on the front wall adapted to hold the workpiece forward of the front wall in a vertical orientation;
- respective first and second vertical guides fixed to the first and second side walls;
- respective first and second vertical slides vertically shiftable along the first and second vertical guides and both projecting forward of the front plane;
- respective first and second front horizontal guides on the vertical slide forward of the front wall from the guide; and
- respective first and second tool holders flanking the workpiece in the workpiece holder, horizontally shiftable in the first and second front horizontal guide on the first and second vertical slides forward of the front wall, and adapted to hold respective tools, whereby horizontal movement of the holders on the respective vertical slides engages the respective tools horizontally with the workpiece in the workpiece holder and vertical movement of the vertical slides in the respective guides moves the tools vertically along the workpiece; and
- a steady rest forming the tool of one of the tool holders, whereby the steady rest can brace the workpiece while the tool of the other of the tool holders machines the workpiece.

13. An apparatus for machining an elongated workpiece with a tool, the apparatus comprising:
- a support column having a generally planar and vertical front wall and a first and second generally planar, parallel, and vertical side walls projecting rearward from respective outer edges of the front wall;
- a workpiece holder on the front wall adapted to hold the workpiece forward of the front wall in a vertical orientation;
- respective first and second vertical guides fixed to the first and second side walls;
- respective first and second vertical slides vertically shiftable along the first and second vertical guides and both projecting forward of the front plane;
- respective first and second front horizontal guides on the vertical slide forward of the front wall from the guide; and
- respective first and second tool holders flanking the workpiece in the workpiece holder, horizontally shiftable in the first and second front horizontal guide on the first and second vertical slides forward of the front wall, and each adapted to hold a plurality of respective tools, whereby horizontal movement of the holders on the respective vertical slides engages the respective tools horizontally with the workpiece in the workpiece holder and vertical movement of the vertical slides in the respective guides moves the tools vertically along the workpiece;
- a conveyor defining a loading/unloading station laterally adjacent the front wall at the first side; and
- a grab on the first tool holder capable of transferring a workpiece on horizontal shifting of the first tool holder on the first vertical slide horizontally from the station to a position engaged in the workpiece holder.

14. The apparatus defined in claim 13, wherein the workpiece holder includes a driven headstock on the front wall for rotating the workpiece about a vertical axis.

* * * * *